United States Patent
Kuroda et al.

(10) Patent No.: US 7,570,061 B2
(45) Date of Patent: Aug. 4, 2009

(54) CANTILEVER CONTROL DEVICE

(75) Inventors: Masaharu Kuroda, Mirai (JP); Hiroshi Yabuno, Tokyo (JP)

(73) Assignees: National Institute of Advanced Industrial Science and Technology, Tokyo (JP); University of Tsukuba, Ibaraki (JP)

( * ) Notice: Subject to any disclaimer, the term of this patent is extended or adjusted under 35 U.S.C. 154(b) by 117 days.

(21) Appl. No.: 11/794,222

(22) PCT Filed: Jan. 20, 2006

(86) PCT No.: PCT/JP2006/000872

§ 371 (c)(1),
(2), (4) Date: Jun. 26, 2007

(87) PCT Pub. No.: WO2006/080257

PCT Pub. Date: Aug. 3, 2006

(65) Prior Publication Data

US 2007/0294042 A1    Dec. 20, 2007

(30) Foreign Application Priority Data

Jan. 26, 2005    (JP) .............................. 2005-018476

(51) Int. Cl.
*G01V 3/08*    (2006.01)
*G01V 3/10*    (2006.01)
*G01R 31/02*    (2006.01)
*G01L 1/04*    (2006.01)
*G01L 1/22*    (2006.01)
*G01C 19/00*    (2006.01)
*G01P 9/00*    (2006.01)
*G01P 3/44*    (2006.01)
*G01P 15/08*    (2006.01)

(52) U.S. Cl. .................. 324/327; 324/762; 73/862.634; 73/862.639; 73/504.15
(58) Field of Classification Search ..................... 72/74, 72/386–388; 73/11.09, 35.05, 204.15, 862.634, 73/862.639, 504.15, 861.19; 116/264, 273, 116/275; 324/76.79, 76.81, 326, 327, 537, 324/754, 762
See application file for complete search history.

(56) References Cited

U.S. PATENT DOCUMENTS 4,565,940 A * 1/1986 Hubbard, Jr. ................. 310/326

(Continued)

FOREIGN PATENT DOCUMENTS

JP    08-166396    6/1996

(Continued)

OTHER PUBLICATIONS

Notification (PCT/IB/338) from the International Bureau dated Jul. 31, 2007 and the English translation of the International Preliminary Report on Patentability with Written Opinion, from the corresponding International Patent Application No. PCT/JP2006/300872.

*Primary Examiner*—Crystal J Barnes-Bullock
(74) *Attorney, Agent, or Firm*—Young Basile

(57) ABSTRACT

A cantilever control device is provided that can prevent, in an atomic force microscope, self-excited oscillation of a cantilever from stopping and prevent a probe of the cantilever from coming into contact with a measurement object. In the atomic force microscope, a cantilever control device 1 is constituted from a cantilever 10 having a probe 12, an actuator 20 that causes self-excited oscillation in the cantilever 10, an oscillation velocity detector 30 that detects the oscillation velocity of the cantilever 10, a displacement calculator 32 that calculates the oscillation displacement of the cantilever 10, and a controller 40 that generates a signal for driving the actuator 20. A feedback control signal S is represented as $(K-G \cdot x^2) \cdot dx/dt$, where x is the oscillation displacement of the cantilever 10, dx/dt is the oscillation velocity of the cantilever 10, and both K and G are feedback gains of a positive value.

9 Claims, 7 Drawing Sheets

U.S. PATENT DOCUMENTS

| | | | |
|---|---|---|---|
| 5,049,797 A * | 9/1991 | Phillips | 318/568.16 |
| 5,681,987 A * | 10/1997 | Gamble | 73/105 |
| 5,688,103 A * | 11/1997 | Tsuji et al. | 414/752.1 |
| 5,955,660 A * | 9/1999 | Honma | 73/105 |
| 6,281,495 B1 | 8/2001 | Kitamura | |
| 6,845,655 B2 * | 1/2005 | van der Weide et al. | 73/105 |
| 6,862,924 B2 * | 3/2005 | Xi et al. | 73/105 |
| 6,945,099 B1 * | 9/2005 | Su et al. | 73/105 |
| 7,107,825 B2 * | 9/2006 | Degertekin et al. | 73/105 |
| 7,155,964 B2 * | 1/2007 | Huang et al. | 73/105 |
| 7,278,296 B2 * | 10/2007 | Kitamura | 73/105 |
| 7,333,191 B2 * | 2/2008 | Murayama et al. | 356/150 |
| 7,425,698 B2 * | 9/2008 | Warren et al. | 250/234 |
| 2004/0093935 A1 | 5/2004 | Yamaoka | |

FOREIGN PATENT DOCUMENTS

| | | | |
|---|---|---|---|
| JP | 11-160333 A | | 6/1999 |
| JP | 2000346784 A | * | 12/2000 |
| JP | 2002162334 A | | 6/2002 |
| JP | 2004156959 A | | 6/2004 |
| JP | 2004163392 A | | 6/2004 |

* cited by examiner

Prior Art

Prior Art

CANTILEVER CONTROL DEVICE

TECHNICAL FIELD

The present invention relates to a cantilever control device for nonlinear feedback control of self-excited oscillation of a cantilever in an atomic force microscope.

BACKGROUND ART

Precision measurement of a sub-nanometer order is demanded in various fields such as MEMS. A scanning probe microscope is used for such precision measurements. An atomic force microscope is known as a typical example of a scanning probe microscope.

The atomic force microscope has an oscillating cantilever. A probe is formed at the cantilever tip. The probe is influenced by an atomic force according to its distance from a measurement object. Equivalent stiffness of the cantilever is changed by this influence of the atomic force. The change in the equivalent stiffness appears as a change in the natural frequency of the cantilever. Therefore, if the change in the natural frequency of the cantilever is detected and the influence of the atomic force acting on the probe is calculated from the change in the natural frequency that is detected, it is possible to measure the distance between the probe and the measurement object. By scanning the measurement of the distance between the probe and the measurement object on the surface of the measurement object, the surface shape of the measurement object is measured in sub-nanometer order. The resolution of this measurement of a surface shape depends on the ease and accuracy of detection of the change in the natural frequency of the cantilever.

In a conventional atomic force microscope, an external excitation method for a cantilever is adopted.

The following two methods exist as methods for detecting a change in the natural frequency of a cantilever. The first is a method for detecting a change in the resonance frequency itself of the cantilever and calculating a change in the natural frequency from the detected change in the resonance frequency. A second method detects a decrease in the response amplitude with respect to a predetermined resonance frequency and calculates a change in the natural frequency from the decrease in the detected response amplitude.

In both methods, a Q value of an environment in which the cantilever is placed (the environment in which the cantilever is placed is hereinafter referred to as the "measurement environment") affects the detection accuracy of a change in a natural frequency. The Q value is determined mainly by the viscous damping coefficient of the measurement environment. For example, the viscous damping coefficient is extremely small in vacuum; the Q value is large, and a resonance peak of the cantilever appears acutely. Consequently, in vacuum, it is possible to detect a change in a resonance frequency easily and accurately. Conversely, the viscous damping coefficient is large in a liquid; the Q value is small, and a resonance peak of the cantilever does not appear acutely even if the cantilever is forced to oscillate. It is therefore difficult to detect a change in a resonance frequency accurately in a liquid.

To address such problems imparted by the environment, a technique for oscillating a cantilever in a self-excited manner and controlling an actuator as an oscillation source attached to the cantilever according to feedback control of positive velocity feedback has been proposed recently (see Japanese Patent No. 3229914). FIG. 6 shows a block diagram of the feedback control in this self-excitation technique for a cantilever.

An atomic force microscope has a cantilever 10, a displacement detector 34, an oscillation velocity calculator 36, an amplifier 48, and an actuator 20.

The actuator 20, as an oscillation source, is connected to the cantilever 10. Self-excited oscillation is generated in the cantilever 10 driven by the actuator 20. A probe 12 is formed on the free end of the tip of the cantilever 10.

The displacement detector 34 is constituted to be capable of detecting an oscillation displacement x of the cantilever 10.

The oscillation velocity calculator 36 is a differentiator. The oscillation velocity calculator 36 is constituted to be capable of receiving x from the displacement detector 34, differentiating the received x, and calculating dx/dt as the oscillation velocity of cantilever 10.

The amplifier 48 is constituted to be capable of receiving dx/dt from the oscillation velocity calculator 36, multiplying the received dx/dt by a linear feedback gain K of a positive value to calculate K·dx/dt, and transmitting the calculated K·dx/dt to a driver 60 as a feedback control signal $S_1$.

The driver 60 is constituted to be capable of amplifying the feedback control signal $S_1$ received from the amplifier 48 and transmitting the feedback control signal $S_1$ to the actuator 20.

The generated feedback control signal $S_1$ is a feedback control signal of positive velocity feedback and is represented as the following Eq. (1).

$$S_1 = K \cdot dx/dt \quad (1)$$

The displacement detector 34 detects an oscillation displacement x of the cantilever 10. The feedback control signal $S_1$ is generated from the detected x. Then this feedback control signal $S_1$ is amplified by the driver 60 to drive the actuator 20; self-excited oscillation is generated in the cantilever 10.

As indicated by Eq. (1), the feedback control signal $S_1$ changes linearly with a linear feedback gain K in association with a change in the oscillation velocity dx/dt of the cantilever 10. A response amplitude a of the cantilever 10 is represented by a function g in the following Eq. (2).

$$a = g(K) \quad (2)$$

FIG. 7i shows a curve C of an amplitude characteristic of the cantilever 10 represented by Eq. (2). In FIG. 7i, the linear feedback gain K is plotted on the abscissa and the response amplitude a is plotted on the ordinate.

FIG. 7i shows that the response amplitude a is 0 and self-excited oscillation is not generated in the cantilever 10 when the linear feedback gain K is equal to or less than an oscillation critical value $K_{LL1}$. When the linear feedback gain K is larger than the oscillation critical value $K_{LL1}$, self-excited oscillation is generated in the cantilever 10 and, as the linear feedback gain K increases, the response amplitude a also increases. Under a condition of $K_{LL1} < K$, when the linear feedback gain K is brought close to the oscillation critical value $K_{LL1}$, the response amplitude a of the self-excitedly oscillating cantilever 10 decreases.

According to linear vibration theory, the oscillation frequency of the self-excited cantilever 10 is equal to its natural frequency. However, according to nonlinear vibration theory, as the oscillation amplitude of the cantilever 10 increases, the oscillation frequency of the cantilever 10 deviates from its natural frequency.

Limiting the response amplitude a of the cantilever 10 to a small value and preventing contact of the probe 12 of the cantilever 10 and the measurement object 70 is required for measurement. When the measurement object 70 is an object that is easily damaged such as an organism-related sample, if the probe 12 comes into contact with the measurement object 70, the measurement object 70 can be damaged easily by the probe 12. Therefore, the response amplitude a must be limited to be equal to or less than a fixed amplitude upper limit value $a_{UL}$. The amplitude upper limit value $a_{UL}$ is the maximum value of the response amplitude a at which the contact of the measurement object 70 and the probe 12 is prevented. Curve C of the amplitude characteristic in FIG. 7$i$ shows that the value $K_{UL1}$ of the linear feedback gain K corresponding to the amplitude upper limit value $a_{UL}$ is a gain upper limit value.

That is, the actuator 20 is driven with the linear feedback gain K that satisfies the condition of $K_{LL1} < K \leq K_{UL1}$; the self-excited oscillation of the cantilever 10 is maintained. At the same time, the response amplitude a is maintained as equal to or less than the amplitude upper limit value $a_{UL}$. Consequently, contact of the probe 12 of the cantilever 10 and the measurement object 70 is prevented.

DISCLOSURE OF THE INVENTION

However, a problem exists in that curve C of the amplitude characteristic of the cantilever 10 shifts because of a change in a measurement environment, a characteristic of the measurement object 70, or a characteristic of cantilever 10, or the like. The oscillation critical value and the gain upper limit value change when curve C of the amplitude characteristic shifts.

For example, as shown in FIG. 7$ii$, the oscillation critical value increases from $K_{LL1}$ to $K_{LL2}$ when the curve C of the amplitude characteristic shifts. The gain upper limit value also thereby increases from $K_{UL1}$ to $K_{UL2}$. Even if the linear feedback gain K is set to satisfy the condition of $K_{LL1} < K \leq K_{UL1}$, it is likely that the linear feedback gain K does not satisfy the condition of $K_{LL2} < K \leq K_{UL2}$. The self-excited oscillation of the cantilever 10 stops or the probe 12 of the cantilever 10 comes into contact with the measurement object 70 if the linear feedback gain K does not satisfy the condition of $K_{LL2} < K \leq K_{UL2}$. In particular, when a measurement environment is liquid, halting of the self-excited oscillation tends to occur.

The present invention solves the problem. It is an object of the invention to provide a cantilever control device that prevents halting of the self-excited oscillation of a cantilever and prevents the probe of the cantilever from coming into contact with a measurement object.

To solve the problem, the invention adopts the constitution described below. A cantilever control device according to an embodiment of claim 1 includes, in an atomic force microscope that measures a surface shape of a measurement object: a cantilever that has a probe at a tip thereof and oscillates; an oscillation source that causes self-excited oscillation in the cantilever; an oscillation velocity displacement detection means for detecting oscillation velocity and oscillation displacement of the cantilever; and a control means for feedback controlling the oscillation source based on the oscillation velocity and the oscillation displacement of the cantilever. A feedback control signal generated by the control means is represented as $$S = \{K - G \cdot |x|^m \cdot (dx/dt)^{n-1}\} \cdot dx/dt, \quad (3)$$

where S is a feedback control signal, K is a feedback gain of a positive value, G is a feedback gain of a positive value, x is the oscillation displacement of the cantilever, dx/dt is the oscillation velocity of the cantilever, m is an integer equal to or larger than 0, and n is a positive odd number that satisfies $m+n \geq 2$.

The following equation is obtained when Eq. (3) is expanded.

$$S = K \cdot dx/dt - G \cdot |x|^m \cdot (dx/dt)^n \quad (4)$$

In Eq. (4), K·dx/dt is a term of a linear component with respect to oscillation velocity of the tip of the cantilever. Also, $G \cdot |x|^m \cdot (dx/dt)^n$ is a term of a nonlinear component with respect to the oscillation velocity of the tip of the cantilever.

By adjusting the value of the nonlinear feedback gain G in Eq. (3), it is possible to adjust the rate of change of the response amplitude a with respect to the rate of change of the linear feedback gain K, i.e., a gradient of a curve of an amplitude characteristic (see FIGS. 2$i$ and 2$ii$). For example, when the value of the nonlinear feedback gain G approaches 0, the gradient of the amplitude characteristic curve increases. The gradient of the amplitude characteristic curve decreases when the value of the nonlinear feedback gain G increases. When the amplitude characteristic curve gradient changes, the gain upper limit value of the linear feedback gain K corresponding to the amplitude upper limit value changes and the range of values allowable as the linear feedback gain K also changes. A range allowed as a set value of the linear feedback gain K expands if the value of the nonlinear feedback gain G is adjusted to reduce the gradient of the amplitude characteristic curve and increase the gain upper limit value of the linear feedback gain K. Therefore, by setting the value of the nonlinear feedback gain G appropriately, irrespective of the shift of the curve of the amplitude characteristic, it is always possible to set the value of the linear feedback gain K in a range between the oscillation critical value and the gain upper limit value. By always setting the linear feedback gain K in the range between the oscillation critical value and the gain upper limit value, it is possible to prevent halting of the self-excited oscillation of the cantilever and prevent the cantilever probe from coming into contact with the measurement object.

In Eq. (3), m need only be an integer that is equal to or larger than 0. It is possible to set m to 0, a positive even number, or a positive odd number. Furthermore, n need only be a positive odd number that satisfies $m+n \geq 2$. The self-excited cantilever is an oscillator of a so-called van der Pol type when m is 2 and n is 1. When m is an integer that is equal to or larger than 0, excluding 2, and n is a positive odd number that satisfies $m+n \geq 2$, equal to or larger than 1, the self-excitedly oscillating cantilever has an effect that is equivalent to that of a van der Pol type oscillator.

The oscillation velocity displacement detection means can be constituted by a contact-type sensor that is set in contact with the cantilever; alternatively, it might be constituted by a non-contact-type sensor set in non-contact with the cantilever. As the contact-type sensor, for example, it is possible to use a piezoelectric element set in the cantilever. As a non-contact-type sensor, it is possible to use a laser Doppler vibration meter that irradiates a laser beam on the cantilever.

The oscillation source need only be constituted to be capable of applying force or bending moment of a magnitude that is proportional to a feedback control signal to the cantilever. The oscillation source can be constituted by a contact-type oscillation source set in contact with the cantilever; alternatively, it might be constituted by a non-contact-type oscillation source set in non-contact with the cantilever.

A cantilever control device according to an invention of claim 2 is the cantilever control device according to claim 1, in which the m is an even number equal to or larger than 0.

According to the invention of claim 2, because m is an even number that is equal to or larger than 0, $|x|^m$ is equal to $x^m$. Equation (3) is therefore represented as the following Eq. (5).

$$S=\{K-G\cdot x^m\cdot(dx/dt)^{n-1}\}\cdot dx/dt=K\cdot dx/dt-G\cdot x^m\cdot(dx/dt)^n \quad (5)$$

In that equation, S is a feedback control signal, K is a feedback gain of a positive value, G is a feedback gain of a positive value, x is the oscillation displacement of the cantilever, dx/dt is the oscillation velocity of the cantilever, m is an integer equal to or larger than 0, and n is a positive odd number that satisfies $m+n \geq 2$.

The feedback control signal is represented by Eq. (5). Compared with the case in which m takes a positive odd number, a solution of an equation of motion of the cantilever is simple. Therefore, selection of appropriate values of K and G is simplified, it is possible to prevent the self-excited oscillation of the cantilever from stopping; it is also possible to prevent the probe of the cantilever from coming into contact with the measurement object.

A cantilever control device according to an invention of claim 3 is the cantilever control device according to claim 1, in which m is 2 and n is 1.

According to the invention of claim 3, because m is 2 and n is 1, Equation (3) is represented by the following Eq. (6):

$$S=(K-G\cdot x^2)\cdot dx/dt, \quad (6)$$

where S is a feedback control signal, K is a feedback gain of a positive value, G is a feedback gain of a positive value, x is the oscillation displacement of the cantilever, and dx/dt is the oscillation velocity of the cantilever.

The feedback control signal is represented by Eq. (6). Therefore, the self-excited cantilever is a van der Pol type oscillator. A solution of an equation of motion of the cantilever can be reached more simply than in the case in which m is an integer equal to or larger than 0, excluding 2, or in which n is a positive odd number, excluding 1, that satisfies $m+n \geq 2$. Therefore, it is possible to select appropriate values of K and G more easily, prevent the self-excited oscillation of the cantilever from stopping, and prevent the cantilever probe from coming into contact with the measurement object.

A cantilever control device, according to an invention of claim 4, is a cantilever control device according to any one of claims 1 through 3, in which the oscillation velocity displacement detection means has oscillation velocity detection means for detecting the oscillation velocity of the cantilever and displacement calculation means for calculating oscillation displacement of the cantilever based on the oscillation velocity of the cantilever detected by the oscillation velocity detection means.

According to the invention of claim 4, the oscillation velocity detection means detects the oscillation velocity of the cantilever and the displacement calculation means, for example, integrates this oscillation velocity to calculate the oscillation displacement of the cantilever. The control means generates a feedback control signal using the oscillation velocity and the oscillation displacement and drives the oscillation source with this feedback control signal.

A cantilever control device, according to an invention of claim 5, is the cantilever control device according to any one of claims 1 through 3, in which the oscillation velocity displacement detection means has displacement detection means for detecting oscillation displacement of the cantilever and oscillation velocity calculation means for calculating the oscillation velocity of the cantilever based on the oscillation displacement of the cantilever detected by the displacement detection means.

According to the invention of claim 5, the displacement detection means detects the oscillation displacement of the cantilever and the oscillation velocity calculation means, for example, differentiates this oscillation displacement to calculate the oscillation velocity of the cantilever. The control means generates a feedback control signal using the oscillation velocity and the oscillation displacement and drives the oscillation source using this feedback control signal.

| Description of Symbols | |
|---|---|
| 1 | Cantilever control device |
| 10 | Cantilever |
| 12 | Probe |
| 14 | Displacement sensor |
| 20 | Actuator |
| 30 | Oscillation velocity detector |
| 32 | Displacement calculator |
| 34 | Displacement detector |
| 36 | Oscillation velocity calculator |
| 40 | Controller |
| 46a, 46b | Multipliers |
| 48, 48a, 48b | Amplifiers |
| 50 | A/D converter |
| 52 | CPU |
| 54 | D/A converter |
| 60 | Driver |
| 70 | Measurement object |
| S, $S_1$ | Feedback control signals |
| K, G | Feedback gains |
| x | Oscillation displacement of cantilever |
| dx/dt | Oscillation velocity of cantilever |
| C, D | Curve of amplitude characteristic |
| a | Response amplitude |
| $a_{UL}$ | Amplitude upper limit value |
| $K_{LL1}$, $K_{LL2}$ | Oscillation critical value |
| $K_{UL1}$, $K_{UL2}$ | Gain upper limit value |

BEST MODE FOR CARRYING OUT THE INVENTION

Figure 1:
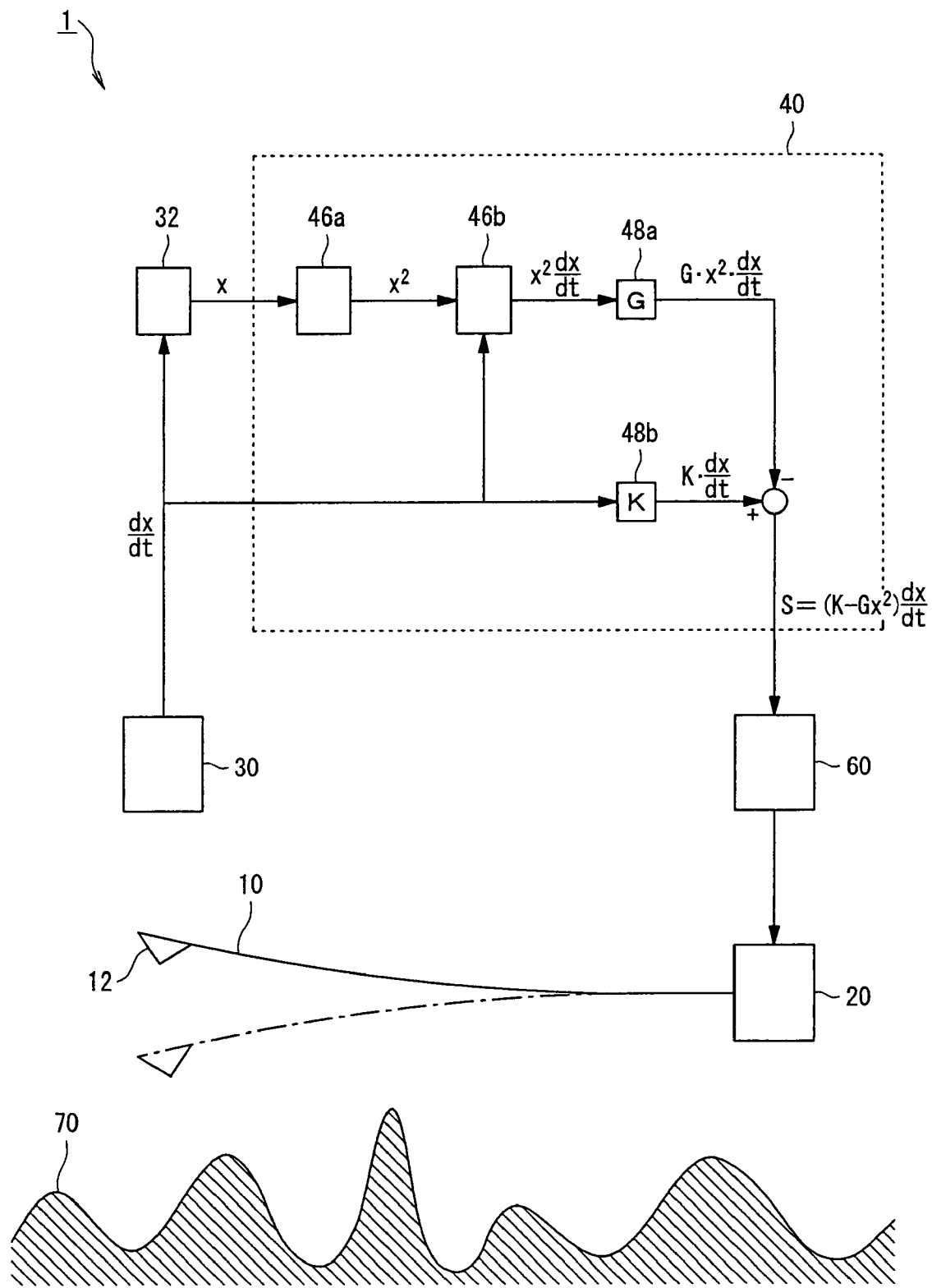
FIG. 1 is a block diagram of a cantilever control device according to a first embodiment.

A first embodiment for carrying out the present invention will be described concerning FIGS. 1, 2i and 2ii.

A cantilever control device 1 is mounted on an atomic force microscope. The cantilever control device 1 has a cantilever 10, an actuator 20, an oscillation velocity detector 30, a displacement calculator 32, and a controller 40.

The actuator 20 as an oscillation source is connected to the cantilever 10. A probe 12 is formed on a free end of the tip of the cantilever 10. The actuator 20 is, for example, a piezoelectric element. Self-excited oscillation is generated in the cantilever 10 driven by the actuator 20.

The oscillation velocity detector 30 is arranged above the tip of the cantilever 10. The oscillation velocity detector 30 is, for example, a laser Doppler vibration meter. The oscillation velocity detector 30 is constituted to be capable of irradiating a laser beam from the laser Doppler vibration meter on the tip of cantilever 10, detecting dx/dt, which is the oscillation velocity of the tip of the cantilever 10, and transmitting the detected dx/dt to the displacement calculator 32 and the controller 40.

The cantilever 10 has a (not-shown) moving device and is constituted to be capable of scanning the surface of a measurement object 70 with the moving device.

The displacement calculator 32 is an integrator and is constituted to be capable of receiving dx/dt from the oscillation velocity detector 30, integrating the received dx/dt, calculating x that is oscillation displacement of the cantilever 10, and transmitting the calculated x to the controller 40.

The controller 40 has multipliers 46a and 46b and amplifiers 48a and 48b.

The multiplier 46a is constituted to be capable of receiving x from the displacement calculator 32 and squaring the received x to calculate $x^2$.

The multiplier 46b is constituted to be capable of receiving $x^2$ from the multiplier 46a, receiving dx/dt from the oscillation velocity detector 30, and multiplying the received $x^2$ by the received dx/dt to calculate $x^2 \cdot dx/dt$.

The amplifier 48a is constituted to be capable of receiving $x^2 \cdot dx/dt$ from the multiplier 46b and multiplying the received $x^2 \cdot dx/dt$ by a nonlinear feedback gain G of a positive value to calculate $G \cdot x^2 \cdot dx/dt$.

The amplifier 48b is constituted to be capable of receiving dx/dt from the oscillation velocity detector 30 and multiplying the received dx/dt by a linear feedback gain K of a positive value to calculate $K \cdot dx/dt$.

The controller 40 is constituted to subtract the $G \cdot x^2 \cdot dx/dt$ calculated by the amplifier 48a from $K \cdot dx/dt$ calculated by the amplifier 48b and transmit $(K-G \cdot x^2)dx/dt$ obtained as a result of the subtraction to a driver 60 as a feedback control signal S. The feedback control signal S generated by the controller 40 is represented by Eq. (6) above.

The driver 60 is, for example, a driver for driving a piezoelectric element and is constituted to amplify the feedback control signal S received from the controller 40 and transmit the feedback control signal S to the actuator 20 to drive the actuator 20.

The oscillation velocity detector 30 constitutes the oscillation velocity detection means, the displacement calculator 32 constitutes the displacement calculation means, the oscillation velocity detector 30 and the displacement calculator 32 constitute the oscillation velocity displacement detection means, and the controller 40 constitutes the control means. In the cantilever control device 1, the respective transmitted and received data are analog signals.

This embodiment is constituted as described above. Actions of this embodiment will be described.

The probe 12 of the cantilever 10 is located above the measurement object 70 to start measurement of a surface shape of the measurement object 70. The oscillation velocity detector 30 detects oscillation velocity dx/dt of the cantilever 10. The oscillation velocity detector 30 transmits the detected dx/dt to the displacement calculator 32, the multiplier 46b of the controller 40, and the amplifier 48b of the controller 40.

The displacement calculator 32 integrates dx/dt received from the oscillation velocity detector 30, calculates x, which is the oscillation displacement of the cantilever 10, and transmits the calculated x to the multiplier 46a of the controller 40.

The multiplier 46a squares the value of x received from the displacement calculator 32 and transmits the calculated $x^2$ to the multiplier 46b.

The multiplier 46b multiplies $x^2$ received from the multiplier 46a by dx/dt received from the oscillation velocity detector 30 to calculate $x^2 \cdot dx/dt$ and transmits the calculated $x^2 \cdot dx/dt$ to the amplifier 48a.

The amplifier 48a multiplies $x^2 \cdot dx/dt$ received from the multiplier 46b by the nonlinear feedback gain G to calculate $G \cdot x^2 \cdot dx/dt$.

The amplifier 48b multiplies dx/dt received from the oscillation velocity detector 30 by the linear feedback gain K to calculate $K \cdot dx/dt$.

The controller 40 subtracts $G \cdot x^2 \cdot dx/dt$ calculated by the amplifier 48a from $K \cdot dx/dt$ calculated by the amplifier 48b to calculate $(K-G \cdot x^2)dx/dt$ and transmits the calculated $(K-G \cdot x^2)dx/dt$ to the driver 60 as the feedback control signal S.

The driver 60 amplifies the feedback control signal S received from the controller 40 and transmits the feedback control signal S to the actuator 20.

The actuator 20 is driven by the transmission from the driver 60 to cause the cantilever 10 to oscillate. The cantilever 10 is self-excited by feedback control.

The self-excited cantilever 10 is a van der Pol type oscillator. The cantilever 10 is feedback-controlled to realize this characteristic. The following equation is obtained when Eq. (6) described above is expanded.

$$S = K \cdot dx/dt - G \cdot x^2 \cdot dx/dt \tag{7}$$

In Eq. (7), $K \cdot dx/dt$ is a term of a linear component with respect to the oscillation velocity dx/dt of the cantilever 10 and $G \cdot x^2 \cdot dx/dt$ is a term of a nonlinear component with respect to the oscillation velocity dx/dt of the cantilever 10. When the nonlinear component and a self-excited oscillation force of the cantilever 10 are balanced, even if a measurement environment is in a liquid with a small Q value, the self-excited oscillation of the cantilever 10 is prevented from stopping and the response amplitude a of the cantilever 10 is maintained as sufficiently small.

The response oscillation a of the cantilever 10 is represented as a function g of the following Eq. (8).

$$a = g(K, G) \tag{8}$$

Figure 2I:
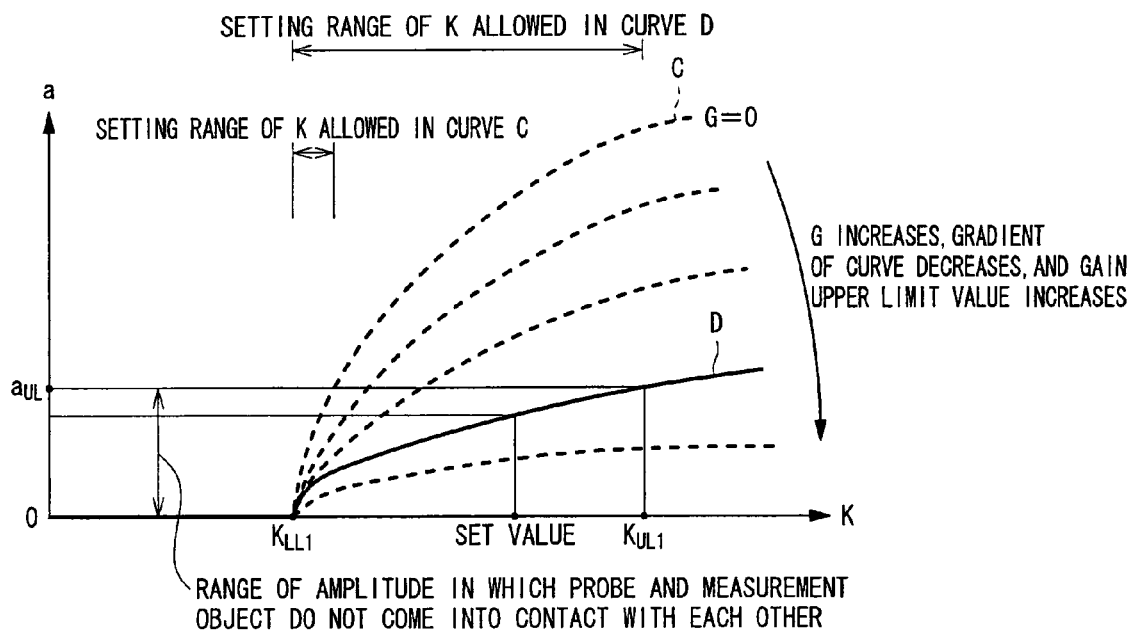
FIGS. 2i and 2ii are explanatory diagrams of an amplitude characteristic of a cantilever controlled by the cantilever control device according to the first embodiment.
Figure 2I:
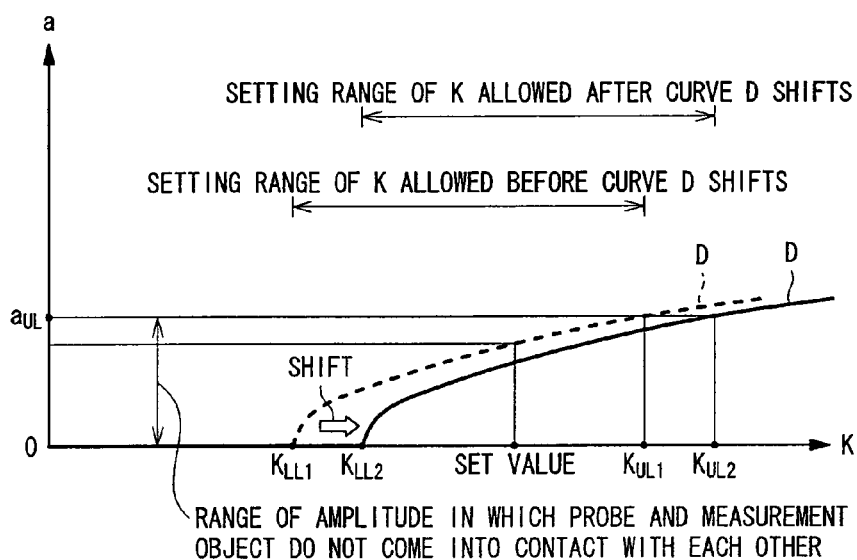

In FIGS. 2i and 2ii, a curve D of an amplitude characteristic of the cantilever 10 controlled by the cantilever control device 1 is shown. In FIGS. 2i and 2ii, the linear feedback gain K is plotted on the abscissa and the response amplitude a is plotted on the ordinate. FIG. 2i shows that, when a value of the nonlinear feedback gain G changes, the rate of change of the response amplitude a with respect to a rate of change of the linear feedback gain K, i.e., a gradient of the curve D of the amplitude characteristic, changes. The gradient of curve D of the amplitude characteristic increases and curve D of the amplitude characteristic comes close to the curve C of the amplitude characteristic described above when the value of the nonlinear feedback gain G approaches 0. The gradient of curve D of the amplitude characteristic decreases when the value of the nonlinear feedback gain G increases.

According to the change in the gradient of the curve D of the amplitude characteristic, the gain upper limit value $K_{UL1}$ of the linear feedback gain K corresponding to the amplitude upper limit value $a_{UL}$ also changes. In curve D of the amplitude characteristic having the same oscillation critical value $K_{LL1}$, when the gradient decreases, the gain upper limit value $K_{UL1}$ increases. If the value of the nonlinear feedback gain G is adjusted, the gradient of curve D of the amplitude characteristic is reduced and the gain upper limit value $K_{UL1}$ of the linear feedback gain K is increased; thereby, the interval between the oscillation critical value $K_{LL1}$ and the gain upper limit value $K_{UL1}$ expands.

If the value of the nonlinear feedback gain G is adjusted and the interval between the oscillation critical value and the gain upper limit value is expanded, as shown in FIG. 2ii, even if curve D of the amplitude characteristic shifts, the oscillation critical value changes from $K_{LL1}$ to $K_{LL2}$ and the gain upper limit value changes from $K_{UL1}$ to $K_{UL2}$, it is always possible to set a value between the oscillation critical value and the gain upper limit value as the linear feedback gain K. If respective values of the linear feedback gain K and the nonlinear feedback gain G are set to such values, it is possible to prevent the self-excited oscillation of the cantilever 10 from stopping and prevent the probe 12 of the cantilever 10 from coming into contact with the measurement object 70. Therefore, even if the measurement object 70 is an organism-related sample in liquid, it is possible to measure the surface shape of the measurement object 70 without damaging the measurement object 70.

Figure 3:
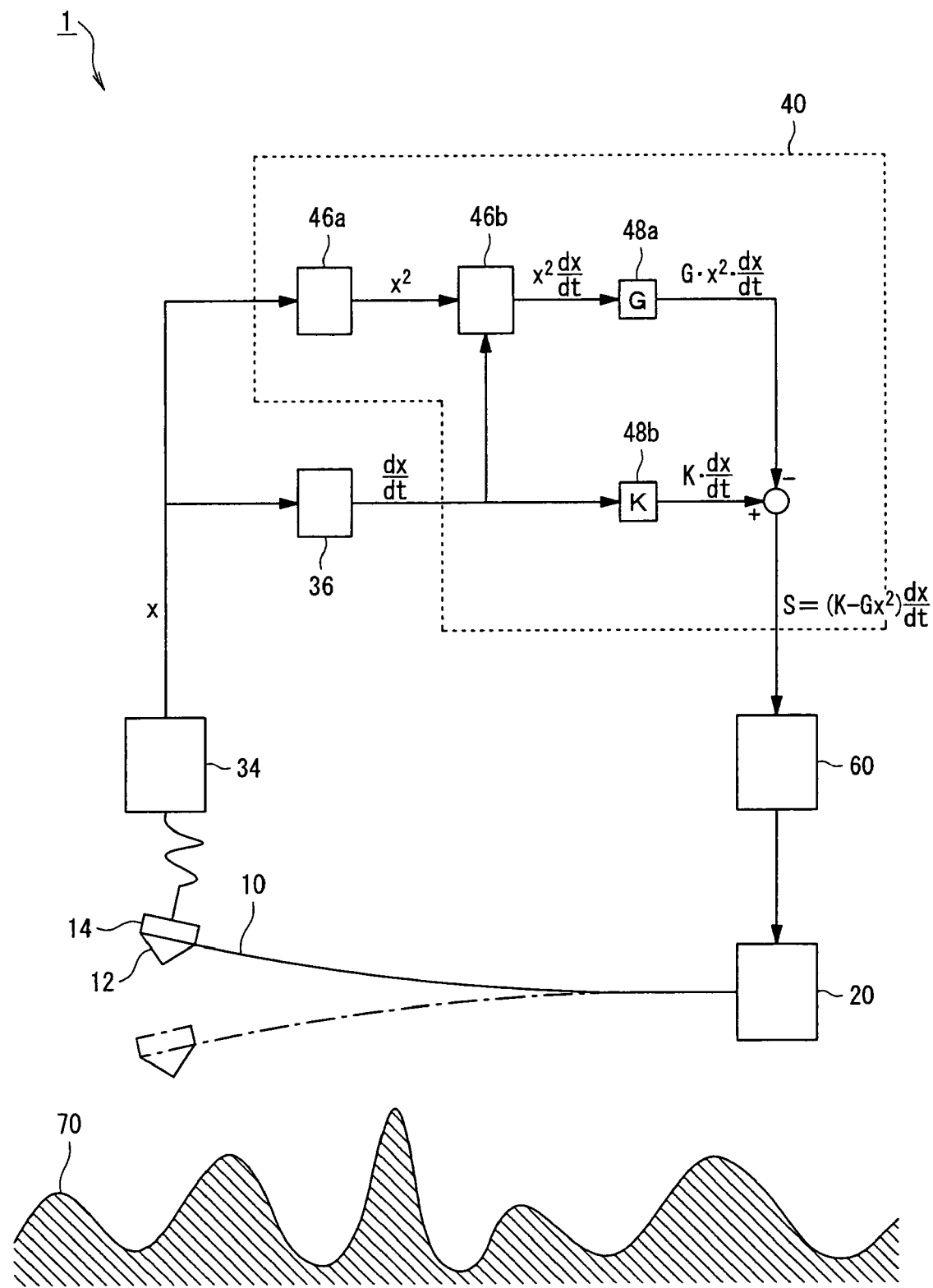
FIG. 3 is a block diagram of a cantilever control device according to a second embodiment.

A second embodiment for carrying out the present invention will be described concerning FIG. 3. Components that are the same as those of the first embodiment are denoted using the same reference numerals and signs.

The cantilever control device 1 mounted on an atomic force microscope has the cantilever 10, the actuator 20, the displacement detector 34, the oscillation velocity calculator 36, and the controller 40.

The actuator 20 is connected to the cantilever 10. The probe 12 is formed on the free end of the tip of the cantilever 10. The actuator 20 is, for example, a piezoelectric element. Self-excited oscillation is generated in the cantilever 10 driven by the actuator 20. For example, a piezoelectric element is mounted on the cantilever 10 as a displacement sensor 14. As an output of the displacement sensor 14, a deflection of the cantilever 10 is detected by the displacement detector 34.

The displacement detector 34 is a signal conditioner such as a charge amplifier. The deflection of the cantilever 10 detected by the displacement detector 34 is equivalent to the oscillation displacement x of the cantilever 10. The displacement detector 34 is constituted to be capable of transmitting the detected oscillation displacement x of the cantilever 10 to the oscillation velocity calculator 36 and the controller 40.

The oscillation velocity calculator 36 is a differentiator. The oscillation velocity calculator 36 is constituted to be capable of receiving x from the displacement detector 34, differentiating the received x to calculate dx/dt that is the oscillation velocity of the cantilever 10, and transmitting the calculated dx/dt to the controller 40.

The controller 40 has multipliers 46a and 46b and amplifiers 48a and 48b.

The multiplier 46a is constituted to be capable of receiving x from the displacement detector 34 and squaring the value of the received x to calculate $x^2$.

The multiplier 46b is constituted to be capable of receiving $x^2$ from the multiplier 46a, receiving dx/dt from the oscillation velocity calculator 36, and multiplying the received $x^2$ by the received dx/dt to calculate $x^2 \cdot dx/dt$.

The amplifier 48a is constituted to be capable of receiving $x^2 \cdot dx/dt$ from the multiplier 46b and multiplying the received $x^2 \cdot dx/dt$ by the nonlinear feedback gain G of a positive value to calculate $G \cdot x^2 \cdot dx/dt$.

The amplifier 48b is constituted to be capable of receiving dx/dt from the oscillation velocity calculator 36 and multiplying the received dx/dt by the linear feedback gain K of a positive value to calculate $K \cdot dx/dt$.

The controller 40 is constituted to subtract $G \cdot x^2 \cdot dx/dt$ calculated by the amplifier 48a from $K \cdot dx/dt$ calculated by the amplifier 48b and transmit $(K-G \cdot x^2)dx/dt$ obtained as a result of the subtraction to the driver 60 as the feedback control signal S.

The feedback control signal S generated by the controller 40 is represented as Eq. (6) described above.

The driver 60 is, for example, an amplifier for driving a piezoelectric element and is constituted to amplify the feedback control signal S received from the controller 40 and transmit the feedback control signal S to the actuator 20 to drive the actuator 20.

The displacement detector 34 constitutes the displacement detection means, the oscillation velocity calculator 36 constitutes the oscillation velocity calculation means, the displacement detector 34 and the oscillation velocity calculator 36 constitute the oscillation velocity displacement detection means, and the controller 40 constitutes the control means. In the cantilever control device 1, the respective transmitted and received data are analog signals.

This embodiment is constituted as described above. Actions of this embodiment will be described.

The probe 12 of the cantilever 10 is located above the measurement object 70 to start measurement of a surface shape of the measurement object 70. The displacement detector 34 detects oscillation displacement x of the cantilever 10 via the displacement sensor 14. The displacement detector 34 transmits the detected x to the oscillation velocity calculator 36 and the multiplier 46a of the controller 40.

The oscillation velocity calculator 36 differentiates x received from the displacement detector 34, calculates dx/dt, which is the oscillation velocity of the cantilever 10, and transmits the calculated dx/dt to the multiplier 46b and the amplifier 48b of the controller 40.

The multiplier 46a squares the value of x received from the displacement detector 34 and transmits the calculated $x^2$ to the multiplier 46b.

The multiplier 46b multiplies $x^2$ received from the multiplier 46a by dx/dt received from the oscillation velocity calculator 36 to calculate $x^2 \cdot dx/dt$ and transmits the calculated $x^2 \cdot dx/dt$ to the amplifier 48a.

The amplifier 48a multiplies $x^2 \cdot dx/dt$ received from the multiplier 46b by the nonlinear feedback gain G to calculate $G \cdot x^2 \cdot dx/dt$.

The amplifier 48b multiplies dx/dt received from the oscillation velocity calculator 36 by the linear feedback gain K to calculate $K \cdot dx/dt$.

The controller 40 subtracts $G \cdot x^2 \cdot dx/dt$ calculated by the amplifier 48a from $K \cdot dx/dt$ calculated by the amplifier 48b to calculate $(K-G \cdot x^2)dx/dt$ and transmits the calculated $(K-G \cdot x^2)dx/dt$ to the driver 60 as the feedback control signal S.

The driver 60 amplifies the feedback control signal S received from the controller 40 and transmits the feedback control signal S to the actuator 20.

The actuator 20 is driven by the transmission from the driver 60 to cause the cantilever 10 to oscillate. The response amplitude a of the cantilever 10 is represented as Eq. (8) described above. Self-excited oscillation is generated in the cantilever 10 by feedback control.

Other actions are the same as those of the first embodiment.

Figure 4:
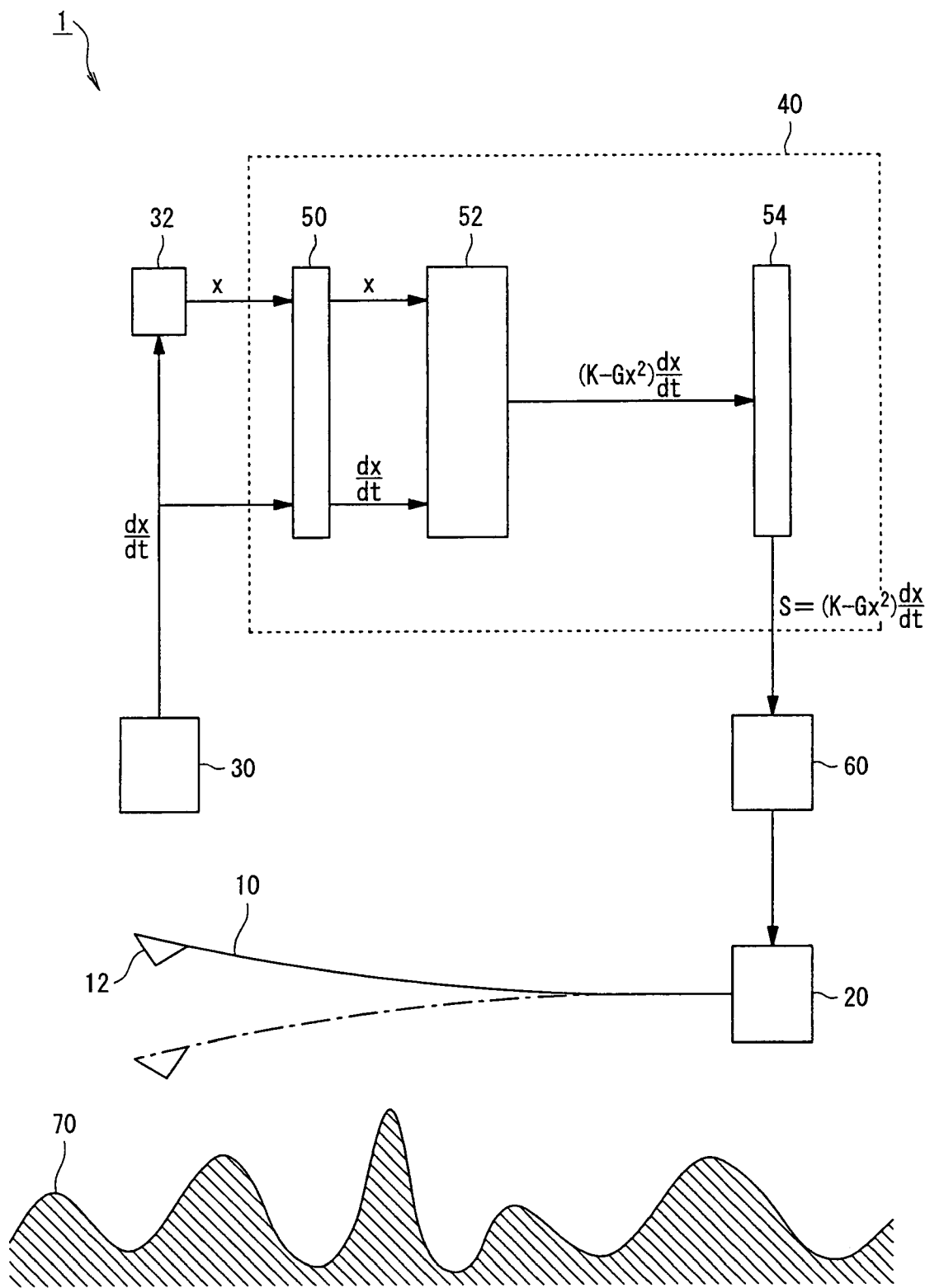
FIG. 4 is a block diagram of a cantilever control device according to a third embodiment.

A third embodiment for carrying out the present invention will be described in relation to FIG. 4. Components which are the same as those of the first embodiment are denoted using the same reference numerals and signs.

As in the first embodiment, the cantilever control device 1 mounted on an atomic force microscope has the cantilever 10, the actuator 20, the oscillation velocity detector 30, the displacement calculator 32, and the controller 40.

The structure of the cantilever control device 1 is the same as that of the first embodiment except for the structure of the controller 40. The oscillation velocity detector 30 forming the oscillation velocity detection means and the displacement calculator 32 forming the displacement calculation means constitute the oscillation velocity displacement detection means. The controller 40 constitutes the control means. The displacement calculator 32 is constituted to be capable of receiving dx/dt from the oscillation velocity detector 30 as analog data and integrating the received dx/dt to calculate x, which is the oscillation displacement of the cantilever 10.

The controller 40 has an A/D converter 50, a CPU 52, and a D/A converter 54.

The A/D converter 50 is constituted to be capable of receiving x from the displacement calculator 32 as analog data, receiving dx/dt from the oscillation velocity detector 30 as analog data, and converting the received x and the received dx/dt into digital data of a time series.

The CPU 52 is constituted to be capable of receiving x and dx/dt from the A/D converter 50 as digital data and calculating $(K-G \cdot x^2)dx/dt$ from the received x and the received dx/dt. As in the first embodiment, K is a linear feedback gain of a positive value and G is a nonlinear feedback gain of a positive value.

The D/A converter 54 is constituted to receive $(K-G \cdot x^2)dx/dt$ from the CPU 52 as digital data, convert the received $(K-G \cdot x^2)dx/dt$ into the feedback control signal S of analog data, and transmit the feedback control signal S of converted analog data to the driver 60.

This embodiment is constituted as described above. Actions of this embodiment will be described.

Processing in the CPU 52 is digitized. Therefore, it is possible to perform adjustment of the linear feedback gain K and the nonlinear feedback gain G flexibly and easily.

Other actions are the same as the actions in the first embodiment.

Figure 5:
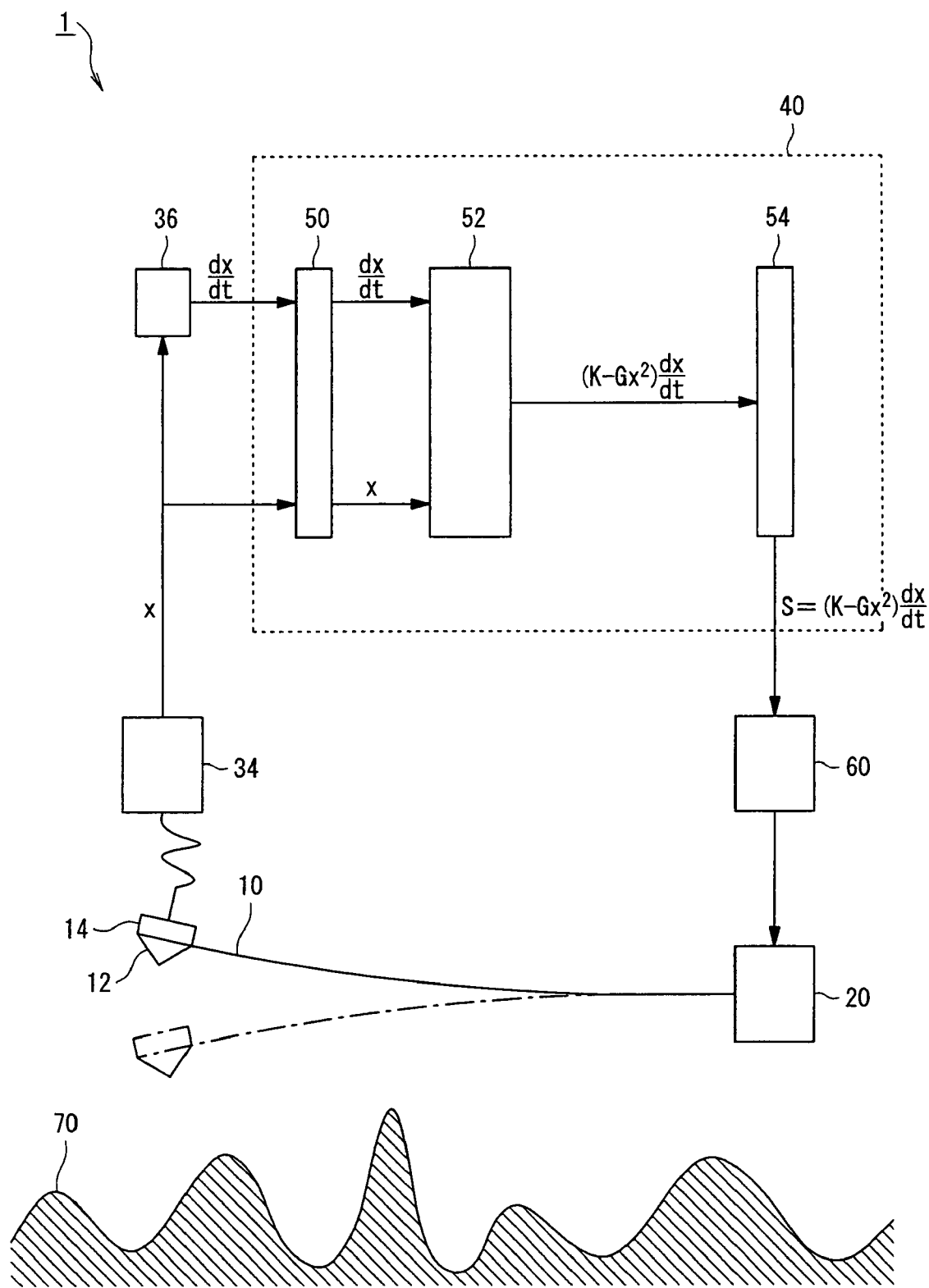
FIG. 5 is a block diagram of a cantilever control device according to a fourth embodiment.
Figure 6:
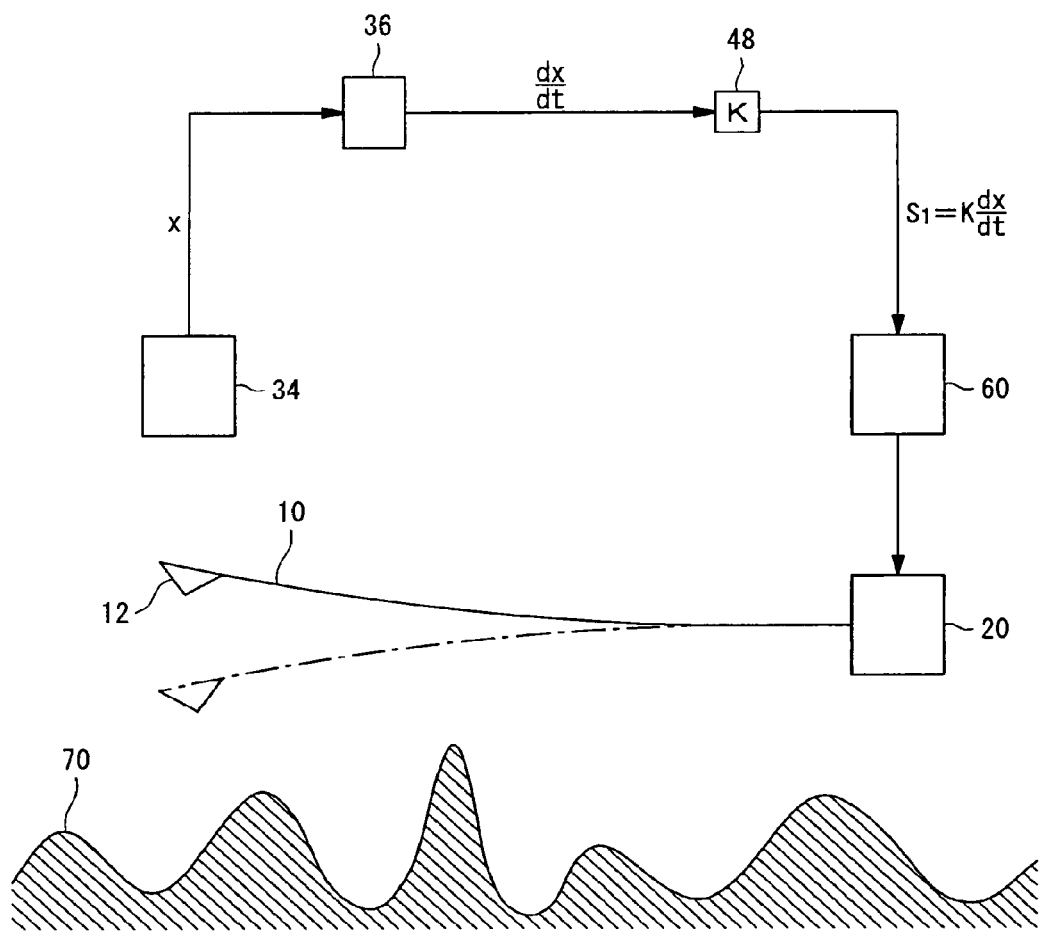
FIG. 6 is a block diagram of conventional feedback control for a cantilever.
Figure 7I:
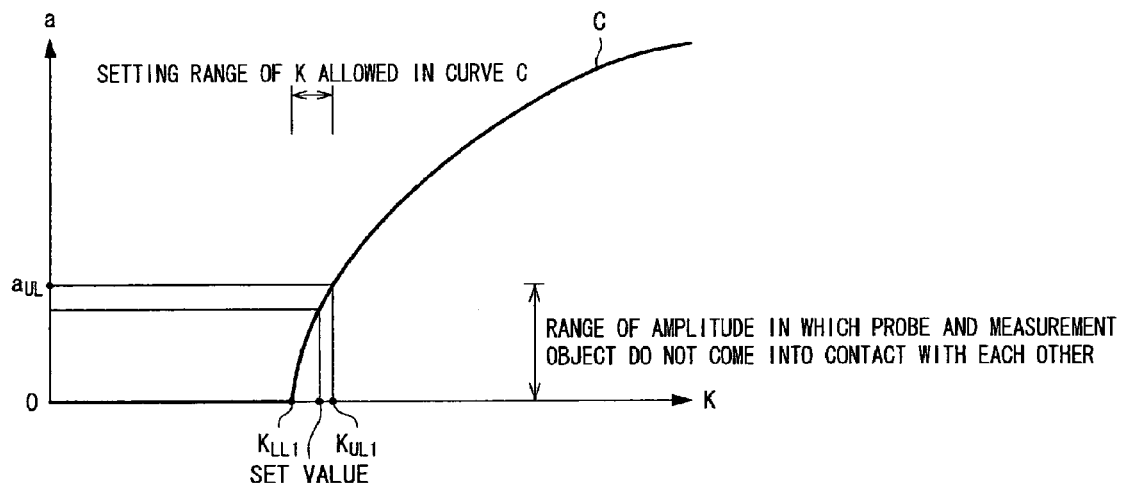
FIGS. 7i and 7ii are expository diagrams of an amplitude characteristic of the cantilever in the conventional feedback control for the cantilever.
Figure 7I:
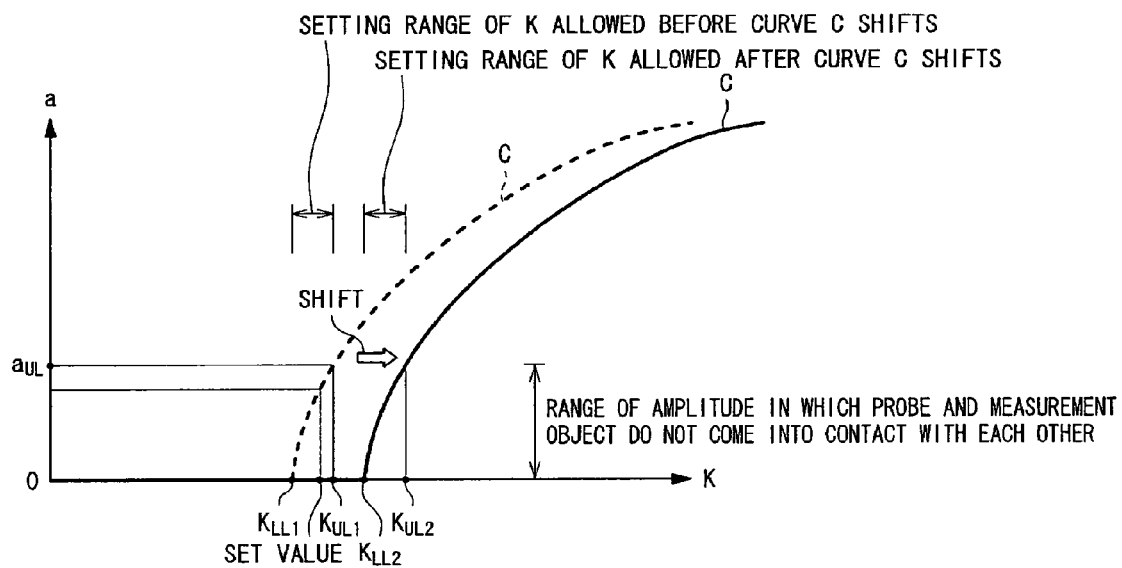

A fourth embodiment for carrying out the invention will be described concerning FIG. 5. Components which are the same as those of the second embodiment are denoted by the same reference numerals and signs.

As in the second embodiment, the cantilever control device 1 mounted on an atomic force microscope has the cantilever 10, the actuator 20, the displacement detector 34, the oscillation velocity calculator 36, and the controller 40.

The structure of the cantilever control device 1 is the same as that of the second embodiment, except for the structure of controller 40. The displacement sensor 14 and the displacement detector 34 forming the displacement detection means and the oscillation velocity calculator 36 forming the oscillation velocity calculation means constitute the oscillation velocity displacement detection means. The controller 40 constitutes the control means. The oscillation velocity calculator 36 is constituted to be capable of receiving x from the displacement detector 34 as analog data and differentiating the received x to calculate dx/dt, which is the oscillation velocity of the cantilever 10.

The controller 40 has the A/D converter 50, the CPU 52, and the D/A converter 54.

The A/D converter 50 is constituted to be capable of receiving x from the displacement detector 34 as analog data, receiving dx/dt from the oscillation velocity calculator 36 as analog data, and converting the received x and the received dx/dt into digital data of a time series.

The CPU 52 is constituted to be capable of receiving x and dx/dt from the A/D converter 50 as digital data and calculating $(K-G \cdot x^2)dx/dt$ from the received x and the received dx/dt. As in the second embodiment, K is a liner feedback gain of a positive value and G is a nonlinear feedback gain of a positive value.

The D/A converter 54 is constituted to receive $(K-G \cdot x^2)dx/dt$ from the CPU 52 as digital data, convert the received $(K-G \cdot x^2)dx/dt$ into the feedback control signal S of analog data, and transmit the feedback control signal S of converted analog data to the driver 60.

This embodiment is constituted as described above. Actions of this embodiment will be described.

Processing in the CPU 52 is digitized. Therefore, it is possible to perform adjustment of the linear feedback gain K and the nonlinear feedback gain G flexibly and easily.

Other actions are the same as the actions in the second embodiment.

In the third and the fourth embodiments, the arithmetic operations are digitized and performed in the controller 40. However, it is also possible to digitize transmission and reception of signals and arithmetic operations in the entire cantilever control device 1. In this case, from the sampling theorem, it is necessary to set a sampling frequency to be twice as high, or more, as the natural frequency of the cantilever 10. From an engineering perspective, it is preferable to set the sampling frequency five to ten times as high as the natural frequency of the cantilever 10.

INDUSTRIAL APPLICABILITY

Using the present invention, self-excited oscillation of a cantilever is prevented from stopping and the probe of the cantilever is prevented by the cantilever control device from coming into contact with a measurement object.

The invention claimed is:

1. In an atomic force microscope that measures a surface shape of a measurement object, a cantilever control device comprising:
    a cantilever that has a probe at a tip thereof and oscillates;
    an oscillation source that causes self-excited oscillation in the cantilever;
    oscillation velocity displacement detection means for detecting oscillation velocity and oscillation displacement of the cantilever; and
    control means for feedback controlling the oscillation source on the basis of the oscillation velocity and the oscillation displacement of the cantilever, wherein
    a feedback control signal generated by the control means is represented as $$S = \{K - G \cdot |x|^m \cdot (dx/dt)^{n-1}\} \cdot dx/dt,$$

where S is a feedback control signal, K is a feedback gain of a positive value, G is a feedback gain of a positive value, x is the oscillation displacement of the cantilever, dx/dt is the oscillation velocity of the cantilever, m is an integer equal to or larger than 0, and n is a positive odd number that satisfies $m+n \geq 2$.

2. The cantilever control device according to claim 1, wherein m is an even number equal to or larger than 0.

3. The cantilever control device according to an claim 2, wherein the oscillation velocity displacement detection means has oscillation velocity detection means for detecting the oscillation velocity of the cantilever and has displacement calculation means for calculating oscillation displacement of the cantilever on the basis of the oscillation velocity of the cantilever detected by the oscillation velocity detection means.

4. The cantilever control device according to claim 2, wherein the oscillation velocity displacement detection means has displacement detection means for detecting oscillation displacement of the cantilever and oscillation velocity calculation means for calculating the oscillation velocity of the cantilever on the basis of the oscillation displacement of the cantilever detected by the displacement detection means.

5. The cantilever control device according to claim 1, wherein m is 2 and n is 1.

6. The cantilever control device according to an claim 5, wherein the oscillation velocity displacement detection means has oscillation velocity detection means for detecting the oscillation velocity of the cantilever and has displacement calculation means for calculating oscillation displacement of the cantilever on the basis of the oscillation velocity of the cantilever detected by the oscillation velocity detection means.

7. The cantilever control device according to claim 5, wherein the oscillation velocity displacement detection means has displacement detection means for detecting oscillation displacement of the cantilever and oscillation velocity calculation means for calculating the oscillation velocity of the cantilever on the basis of the oscillation displacement of the cantilever detected by the displacement detection means.

8. The cantilever control device according to claim 1, wherein the oscillation velocity displacement detection means has oscillation velocity detection means for detecting the oscillation velocity of the cantilever and has displacement calculation means for calculating oscillation displacement of the cantilever on the basis of the oscillation velocity of the cantilever detected by the oscillation velocity detection means.

9. The cantilever control device according to claim 1, wherein the oscillation velocity displacement detection means has displacement detection means for detecting oscillation displacement of the cantilever and oscillation velocity calculation means for calculating the oscillation velocity of the cantilever on the basis of the oscillation displacement of the cantilever detected by the displacement detection means.

* * * * *